(12) United States Patent
Hart et al.

(10) Patent No.: US 9,053,313 B2
(45) Date of Patent: Jun. 9, 2015

(54) METHOD AND SYSTEM FOR PROVIDING CONTINUED ACCESS TO AUTHENTICATION AND ENCRYPTION SERVICES

(75) Inventors: Jason Dean Hart, Fremont, CA (US); Matthew Patrick Herscovitch, Fremont, CA (US)

(73) Assignee: Identive Group, Inc., Santa Ana, CA (US)

( * ) Notice: Subject to any disclaimer, the term of this patent is extended or adjusted under 35 U.S.C. 154(b) by 0 days.

(21) Appl. No.: 13/808,170

(22) PCT Filed: May 27, 2011

(86) PCT No.: PCT/AU2011/000641
§ 371 (c)(1), (2), (4) Date: Jan. 3, 2013

(87) PCT Pub. No.: WO2011/150450
PCT Pub. Date: Dec. 8, 2011

(65) Prior Publication Data
US 2013/0290717 A1    Oct. 31, 2013

(51) Int. Cl.
| | | |
|---|---|---|
| G06F 21/00 | (2013.01) | |
| G06F 21/34 | (2013.01) | |
| G06F 21/60 | (2013.01) | |
| G06F 21/62 | (2013.01) | |
| G06Q 20/02 | (2012.01) | |
| G06Q 20/34 | (2012.01) | |
| G06Q 20/38 | (2012.01) | |
| G06Q 20/40 | (2012.01) | |
| G07F 7/10 | (2006.01) | |

(52) U.S. Cl.
CPC ........... *G06F 21/34* (2013.01); *G06F 21/602* (2013.01); *G06F 21/6245* (2013.01); *G06Q 20/02* (2013.01); *G06Q 20/351* (2013.01); *G06Q 20/38* (2013.01); *G06Q 20/3823* (2013.01); *G06Q 20/3829* (2013.01); *G06Q 20/40975* (2013.01); *G07F 7/1016* (2013.01)

(58) Field of Classification Search
USPC .................... 713/168, 176, 182, 183; 719/330
See application file for complete search history.

(56) References Cited

U.S. PATENT DOCUMENTS 7,085,931 B1 *    8/2006   Smith et al. .................... 713/182
7,487,357 B2 *    2/2009   Smith et al. .................... 713/176

(Continued)

FOREIGN PATENT DOCUMENTS

| EP | 0936530 A1 | 8/1999 | ............... G06F 1/00 |
| WO | WO 01/18635 A2 | 3/2001 | ............... G06F 1/00 |
| WO | WO 0118635 A2 * | 3/2001 | |

OTHER PUBLICATIONS

Form PCT/ISA/210—Int'l Search Report (from corresponding Int'l Patent App. No. PCT/AU2011/000641; 3 pages.

*Primary Examiner* — Syed Zaidi
(74) *Attorney, Agent, or Firm* — Proskauer Rose LLP

(57) ABSTRACT

A system and method for providing continued access to authentication and encryption services that includes a secure key store communicably coupled to a virtual smart card server. A virtual smart card driver is also provided and is communicably coupled to a virtual smart card secure hardware server. The virtual smart card driver communicates with an authentication client to authenticate a user, and access the user's private key stored in the secure key store when the user's physical smart card is unavailable. Continued access is provided when the user has been authenticated.

10 Claims, 2 Drawing Sheets

(56) References Cited

U.S. PATENT DOCUMENTS

| | | | |
|---|---|---|---|
| 7,890,767 B2* | 2/2011 | Smith et al. | 713/182 |
| 2004/0154027 A1* | 8/2004 | Vandewalle et al. | 719/330 |
| 2006/0248347 A1* | 11/2006 | Smith et al. | 713/185 |
| 2007/0040021 A1 | 2/2007 | Nakayma | 235/380 |
| 2009/0037729 A1 | 2/2009 | Smith et al. | 713/158 |
| 2009/0172407 A1* | 7/2009 | Smith et al. | 713/183 |

* cited by examiner

METHOD AND SYSTEM FOR PROVIDING CONTINUED ACCESS TO AUTHENTICATION AND ENCRYPTION SERVICES

FIELD OF THE INVENTION

The present invention relates to computer security. More particularly, it concerns a system and method for providing continued access, to authentication and encryption services.

DESCRIPTION OF THE RELATED ART

Public Key Infrastructure (PKI) provides the foundation for the implementation of various security functions such as authenticating identities, signing electronic documents and encrypting data. The algorithms, protocols and data formats for a public key infrastructure are well defined in public standards, for example X.509, and PKCS standards.

The security of a PKI system requires that a user's private key can only ever be accessed by that person. Protecting the private key is very difficult, and while various solutions exist, each has its limitations.

Software solutions store the private key in a file on the user's computer, portable drive or in a logical file on a network server. The private key is stored in an encrypted format with the encryption key derived generally from something the user knows such as a pass-phase, password, the user's network logon password, a static key, numerical representations of pictograms, and so forth.

Software solutions present numerous security issues. The most important problem is that the key used to encrypt the private key is generally very weak. This is because the key must be derived from something the user knows, and remembering passwords or pass-phrases of the required length is too difficult to work in practice. The alternative to this—relying on a static key—is quite insecure, as the static key may be discovered by an attacker.

Further, all software solutions require that the private key be decrypted on the user's workstation and then stored in plaintext in the workstation's memory so that cryptographic operations can occur. This means that viruses or other malicious software on the workstation may access the plaintext private key and defeat the security of the system. This situation is particularly serious as the attacker can access the entire private key, and can use it to perform the attacks on other workstations, not just the user's current workstation.

Lastly, software solutions are easily duplicated, allowing for multiple instances of the user's private key to be taken generally without the user's knowledge, allowing the key to be decrypted on remote systems without any indication to the user or administrator that such an attack has occurred.

Hardware solutions which protect the private key respond to the weaknesses of software solutions by storing the private key in a self contained, tamper resistant hardware device separate from the user's computer. This hardware device can be configured to prevent direct access to the private key; instead only offering operations that use the key, for example operations to decrypt or sign data, rather than operations to retrieve the private key. This combination of secure storage and the performance of all cryptographic operations on the secure device, mean that the private key is never stored in the workstation's memory, and hence remains secure from duplication, modification or brute force attack.

The hardware device provides a very limited interlace, and due to its relative simplicity can be better analysed to reduce the potential for defects, and can undergo formal security evaluation processes as defined by US Federal Information Process Standards (FIPS) and Common Criteria, for example.

Further, the combination of a restricted interface and the hardware device means that a very high level of security can be achieved with only short passphrases/PINs. This is because without physical disassembly at a microchip level there is no way to access the private key directly. Additionally, an intruder lockout system can be implemented so that after a certain number of incorrect PINs, the private key is destroyed. Thus, whereas in a software solution the private key may be stolen, defeating the entire system, or the encrypted private key can be stolen and an offline attack mounted; in a hardware solution neither of these attacks are possible, barring defects in the system (though given the simplicity of the system, defects are generally rare).

Further, the hardware device can be made portable, so that it is carried with the user and is detached from the workstation when not in use, further limiting the potential for the key to be compromised. Smart cards are an extremely reliable model for the hardware device.

Despite their obvious security benefits, smart cards are not widely deployed. Producing the physical cards, as well as the servers and processes to issue and manage them, can be costly. Additionally, smart cards impede usability when the card is temporarily unavailable or permanently lost/destroyed.

To improve security, users are generally required to detach their smart cards from their workstations when they are not in use. However, it is a common occurrence for a user to misplace or lose their smart card. In addition to losing the cards, users will often forget their PINs and in some cases damage their smart card.

In an ordinary smart card management system, replacing a smart card is a time consuming process. The user must find a security officer, and have their identity verified by some other (usually manual) means, to be issued with a replacement card. This is costly in terms of time lost, as the user must leave their workstation to get the replacement, and is impossible for users who cannot immediately contact a security officer, for example users who are travelling or otherwise not in an office.

Further, even when smart cards are deployed they are often not deployed fully, as 'backdoors' are often left in place to provide emergency access to information. An example of this is that even in smart card enabled Active Directory deployments, smart card logon is often not enforced, or passwords are used to allow access when the smart card is not available.

A smart card additionally provides a highly secure way to encrypt and decrypt information stored in email, files and communications. When a user forgets their smart card, access to this encrypted information is generally not available even when a "backdoor" password is provided to login to the computer. This is due to the fact that the "keys" required to decrypt/encrypt the information are simply not available. In real world applications, this significantly disadvantages organizations who attempt to deploy a smart card security solution and grapple with security verses productivity.

Lastly, smart cards are often combined to provide physical building access using a variety of radio proximity protocols. Two of the more popular protocols are RFID at 125 khz and ISO 14443 operating at 13.56 Mhz. When a user forgets or has their smart card stolen, access to their building is also interrupted forcing the person to obtain a new smart card to gain access to the building systems.

The present invention advantageously provides an alternative to pure hardware or software security solutions. The system and method according to certain embodiments of the present invention may advantageously be used to maintain a true smart card environment, when the smart card is not available.

SUMMARY OF THE INVENTION

According to a first aspect of the invention, there is provided a system and method for providing continued access to authentication and encryption services that includes a secure key store communicably coupled to a virtual smart card server. The system further includes a virtual smart card driver that is communicably coupled to a virtual smart card secure hardware server. The virtual smart card driver communicates with an authentication client to authenticate a user, and access the user's private key stored in the secure key store when the user's physical smart card is unavailable. Continued access is provided when the user has been authenticated.

In accordance with a further aspect of the invention, there is provided a smart card emulator for providing continued access to authentication and encryption services when a user's physical smart card is unavailable. The emulator includes communication means to access a secure key store, a virtual smart card server, and a virtual smart card driver. The emulator initiates communication with the virtual smart card driver to authenticate a user via an authentication client, and access the user's private key stored in the secure key store, to allow continued access to authentication and encryption services.

In accordance with another aspect of the invention, smart card commands are communicated to the virtual smart card server as application protocol data units (APDU), and the secure key store is a hardware security module. Further, the secure key store is a key escrow service of a certificate authority, or a software key store. Additionally, the authentication client authenticates a user by biometric identification, or credit card identification, or photo identification, or password identification.

BRIEF DESCRIPTION OF THE DRAWINGS

The invention will now be described in a non-limiting manner with respect to a preferred embodiment in which.

DETAILED DESCRIPTION OF PREFERRED EMBODIMENTS

In the following discussion and in the claims that follow, the terms "including", and "includes" are used, and are to be read, in an open-ended fashion, and should be interpreted to mean "including, but not limited to . . . ".

Additionally, in the following discussion and in the claims that follow, the term "smart card" is to be given a broad meaning and refers to a card containing a microprocessor that may communicate with a number of systems.

The concept of a virtual smart card is often used for testing smart card code. However, such systems are always implemented as direct simulators. For example, prior art virtual smart card systems provide only an alternative to a physical smart card by simply creating an additional set of keys and certificates. Without a strong authentication system and direct integration with an operating system, the security of previous virtual smart card systems is not an improvement over other types of key storage mechanisms. The present invention advantageously provides authentication and protection of a user's keys while still enabling access to user systems and data when the device used to encrypt the relevant information (i.e. a user's smart card) is not present or available.

Figure 1:
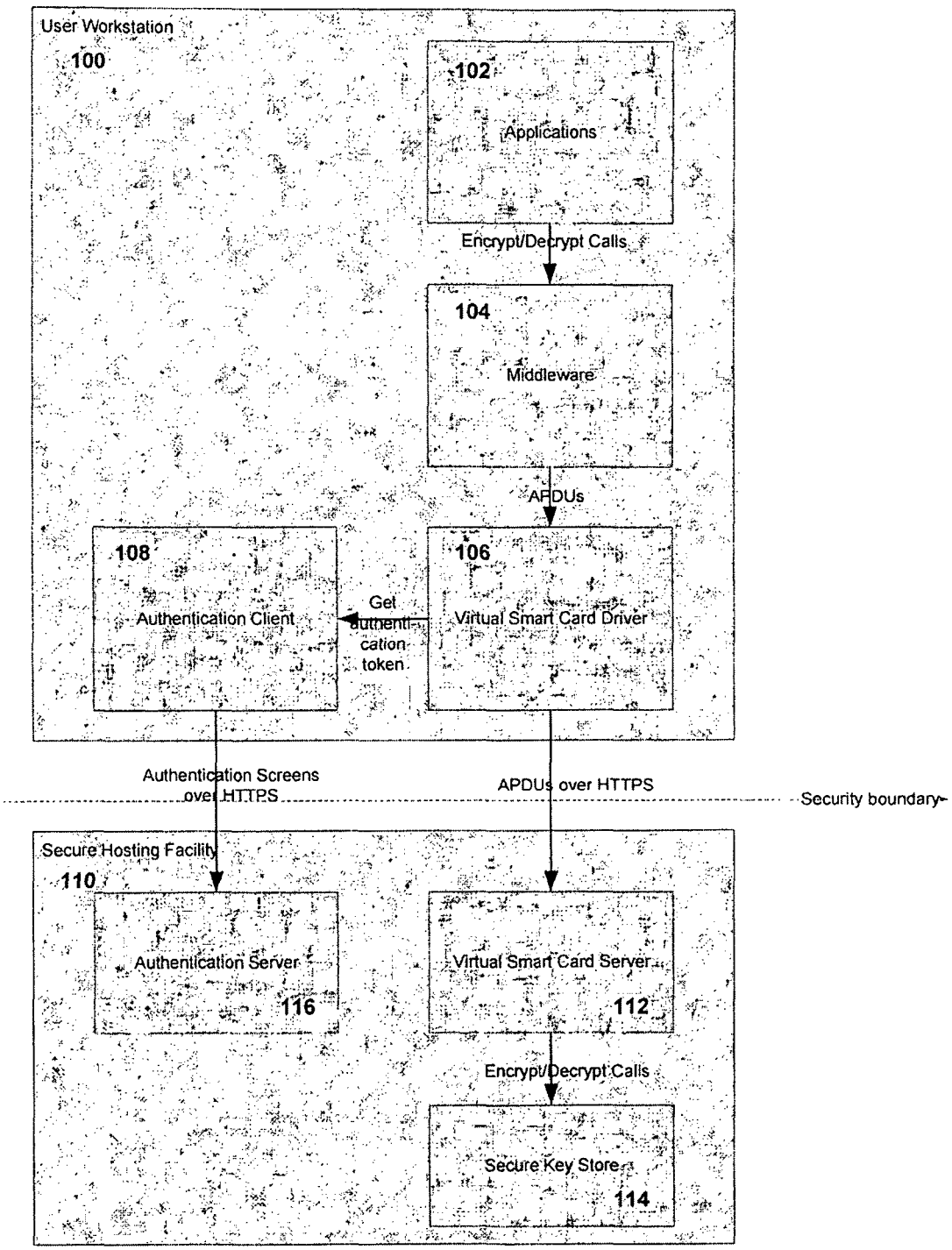
FIG. 1 is an overview of a preferred embodiment of the present invention.

FIG. 1 shows an overview of the present invention in accordance with a preferred embodiment.

The user's workstation 100 utilises the standard components of an ordinary smart card arrangement.

Applications 102 are applications that make use of PKI services. For example, a Windows logon process, an email program or a file encryption program. Other application programs may be utilised, as will be appreciated by one skilled in the art.

Middleware 104 is often a part of the operating system, and receives requests for PKI services from applications 102. The middleware 104 translates these requests into the appropriate smart card commands preferably as application protocol data units (APDUs). Middleware 104 will preferably support one or more smart card standards, such as the Federal Information Processing Standards (FIPS) publication 201 or card edge application protocol interfaces, that determine the mapping from PKI requests to APDUs.

The virtual smart card driver 106 is a device driver that exposes a smart card interface. However, the driver 106 actually translates the APDUs it receives into HTTPS requests that encapsulate the APDUs and which are sent to the virtual smart card server 112. Thus, while to the middleware 104 and the applications 102 it appears that a smart card is present and being used for the PKI operations, these operations are actually being performed by the virtual smart card server 112 at the secure hosting facility 110.

Use of APDUs instead of the high-level commands used in prior art systems, allows software on the user's workstation to be standard software, and the virtual smart card driver 106 to be an ordinary device driver.

The authentication client 108 displays the required prompts to collect the authenticators necessary to satisfy the policies of the authentication server 116. It will be appreciated that the authentication client 108 may be a web browser, or a native application, or other similar interface.

A secure hosting facility 110, having stringent physical and computer security protections hosts the components outlined below.

As briefly discussed above, the virtual smart card server 112 is a service that receives smart card commands in the form of APDUs and interprets them to perform cryptographic operations in conjunction with the keys stored in the secure key store 114. The server 112 emulates a particular set of APDUs for the relevant smart card standard, and converts the APDUs received into high level cryptographic operations that are called to the secure key store 114. It will be appreciated that the virtual smart card server 112 may support a variety of APDU sets so that it can emulate a variety of smart card standards.

It is to be appreciated that operating at the lower APDU level, the concept of encryption and decryption is of no importance to the greater part of the virtual smart card server 112.

The secure key store 114 is preferably a secure repository for private keys. It may be implemented either in software, using a hardware security module, or may be delegated to another service, such as the key escrow service of a certificate authority, or a software key store such as the Java Key Store.

The authentication server 116 is preferably a standard multifactor authentication server that issues authentication tickets in response to the provision of valid authenticators for a user.

Figure 2:
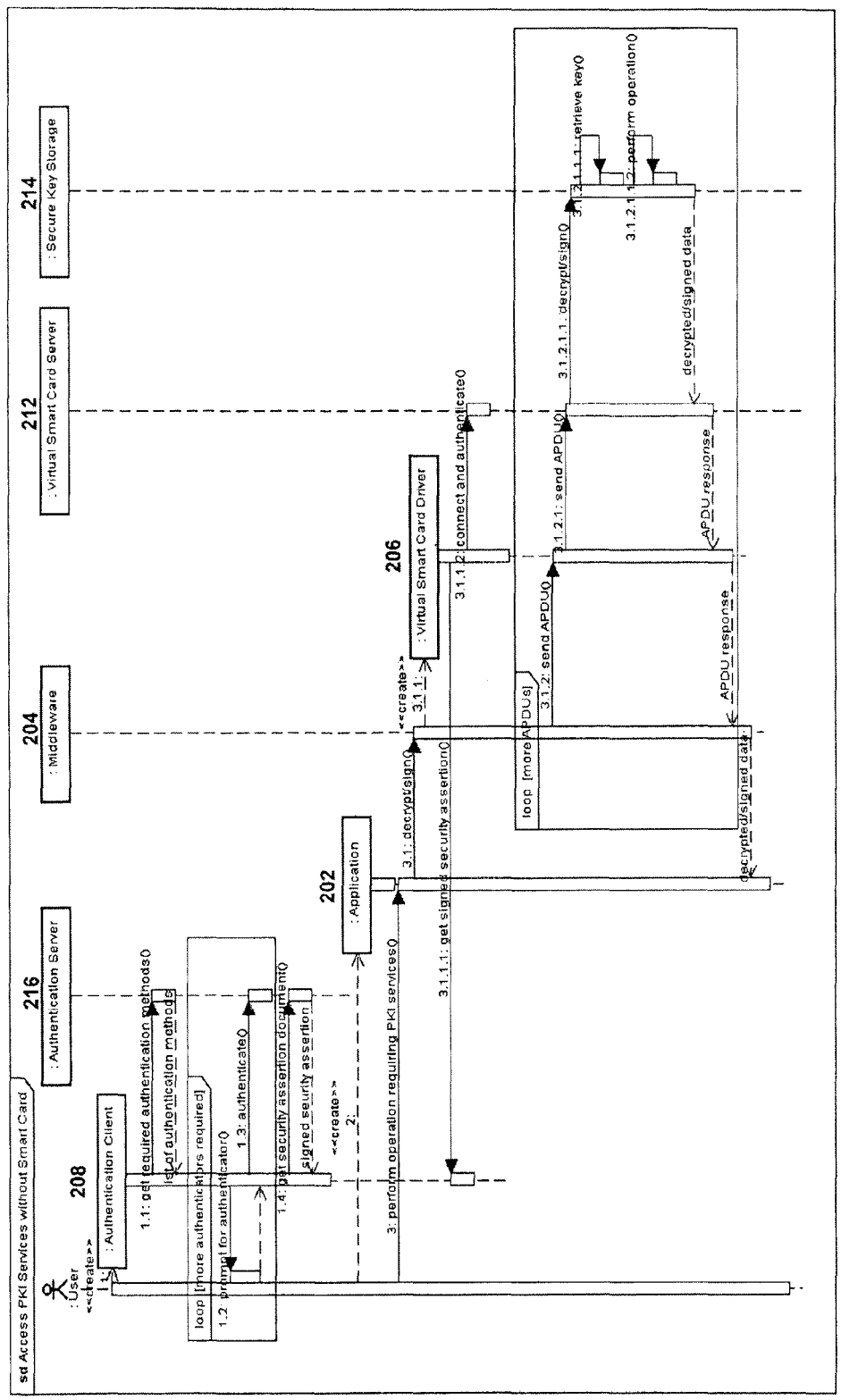
FIG. 2 is an overview of the methodology in accordance with a preferred embodiment of the present invention.

FIG. 2 illustrates how the components outlined above in FIG. 1 interact to allow a user to access PKI services when the user's smart card is not available.

Steps 1.1-1.4 represent the multifactor authentication process. The user interacts with the authentication client 208 to provide all of the authenticators that are required by the authentication server 216. At the conclusion of this process the authentication client 208 receives a signed security assertion from the authentication server 216 and caches this assertion for later use.

At step 2, the user launches an application 202. This may be an explicit process, such as starting an email client, or an implicit process, such as initiating the workstation logon process.

At step 3 the user performs an operation in the application 202 that requires PKI services. This initiates the calls to the middleware 204 and virtual smart card driver 206.

Steps 3.1 and 3.1.1 represent the ordinary flow of control from the application 202, through the middleware 204 to the smart card driver 206.

In 3.1.1.1 and 3.1.1.2 the virtual smart card driver 206 opens up an authenticated connection to the virtual smart card server 212. The authentication is performed using the signed authentication assertion, that was cached in the authentication client 208.

Steps 3.1.2 onwards represent the process of sending the APDUs to the virtual smart card server 212 for processing, and then acting upon the results. The virtual smart card server 212 receives the APDU in step 3.1.2.1 and then in step 3.1.2.1.1 converts the operation into a high level decrypt or sign operation that is then submitted to the secure key store 214.

As discussed above, the present invention allows a user to access smart card services (such as gain access to physical and encrypted computer assets when that information was originally encrypted with a smart card), when the user's smart card is unavailable. The relevant application is unaware that the smart card is unavailable, and security processing is undertaken in the normal way. That is, from the point of view of the application it looks as though the original smart card is present.

The present invention may be employed in the form of a smart card emulator which can be provisioned dynamically with communication means to receive one or more user's certificates from the secure key store and access/identification information. It will be appreciated that the emulator may itself contain secure storage means to house user certificates. Once a user has been identified and authenticated by an authentication client, the smart card emulator (hardware reader) can provide continued access to authentication and encryption services without the user's smart card being present.

A particularly preferred embodiment of the present invention may be used at a Microsoft Windows smart card logon system when disconnected from the relevant corporate network. In this case, a full PKI authentication does not occur, but rather Windows performs an abbreviated authentication process using data that was cached during the last successful connected PKI authentication.

As will be appreciated, the disconnected logon can only be successful if the user presents a smart card with the exact same certificates and private keys. If the smart card is lost or unavailable, the only way to gain access to the system is to issue a replacement smart card and perform a logon when connected to the corporate network. Of course, these steps are simply not possible for remote users, and may take days to rectify.

The present invention addresses this problem by providing a virtual smart card system that features strong multi-factor authentication—such as biometrics, photo identification, credit card, password, picture password, or other suitable physical or electronic form of identification—and provides access to escrowed copies of relevant certificates and private keys once suitable identity parameters are met. It is to be understood that the present invention provides a suitable solution to security measures when a smart card is unavailable. It is not an alternative to a smart card system.

The security properties of this present invention are similar to those of a traditional hardware solution. The private key is never stored on the user's workstation, and thus it is not vulnerable to being stolen by a virus or other malicious software on the workstation. Further, as the authentication server is an online system and the encrypted private key cannot be retrieved, the present invention facilitates a secure intruder lockout system that prevents offline attacks and brute force attacks.

While viruses and other malicious software on the workstation still pose a security problem, this problem is equivalent to that faced in a traditional hardware solution. Though the virus may be able to perform PKI operations as the user, this is as much a problem for the hardware solution as the software solution. However, by emulating a hardware-type solution, the present invention ensures that the private key cannot be stolen, and therefore the window for attack is limited to the time during which the user is logged on to a compromised workstation.

It will be appreciated by the person of skill in the art that the authentication methods used can include any number of arbitrarily complex authentication schemes, ranging from simple passphrases to biometric and geo-location services. These authentication methods can be tailored to particular organisational requirements.

It is to be understood that the above embodiments have been provided only by way of exemplification of this invention, and that further modifications and improvements thereto, as would be apparent to persons skilled in the relevant art, are deemed to fall within the broad scope and ambit of the current invention described and claimed herein.

The claims defining the invention are as follows:

1. A system for providing continued access to authentication and encryption services, the system comprising:
   a server computing device comprising a secure key store communicably coupled to a virtual smart card server; and
   a client computing device comprising a virtual smart card driver communicably coupled to the virtual smart card server, and an authentication client,
   wherein the virtual smart card driver communicates with the authentication client to authenticate a user of the client computing device, and access the user's private key stored in the secure key store when the user's physical smart card is unavailable, the private key corresponding to a key stored on the physical smart card, and
   wherein continued access to encrypted information via an application is provided when the user has been authenticated, the encrypted information originally encrypted using the physical smart card.

2. The system according to claim 1, wherein smart card commands are communicated to the virtual smart card server as application protocol data units (APDU).

3. The system according to claim 1, wherein the secure key store is a hardware security module.

4. The system according to claim 1, wherein the secure key store is a key escrow service of a certificate authority, or a software key store.

5. The system according to claim 1, wherein the authentication client authenticates a user by biometric identification, or credit card identification, or photo identification, or password identification.

6. A method for providing continued access to authentication and encryption services, including the steps of:
- providing, by a server computing device, a secure key store communicably coupled to a virtual smart card server; and
- providing, by a client computing device, a virtual smart card driver communicably coupled to the virtual smart card server, and an authentication client,
- wherein the virtual smart card driver communicates with the authentication client to authenticate a user of the client computing device, and access the user's private key stored in the secure key store, the private key corresponding to a key stored on the physical smart card, and
- providing continued access to encrypted information via an application when the user's physical smart card is unavailable, the encrypted information originally encrypted using the physical smart card.

7. The method according to claim 6, wherein smart card commands are communicated to the virtual smart card server as application protocol data units (APDU).

8. The method according to claim 6, wherein the secure key store is a hardware security module.

9. The method according to claim 6, wherein the secure key store is a key escrow service of a certificate authority, or a software key store.

10. The method according to claim 6, wherein the authentication client authenticates a user by biometric identification, or credit card identification, or photo identification, or password identification.

* * * * *

UNITED STATES PATENT AND TRADEMARK OFFICE
CERTIFICATE OF CORRECTION

| | | |
|---|---|---|
| PATENT NO. | : 9,053,313 B2 | Page 1 of 1 |
| APPLICATION NO. | : 13/808170 | |
| DATED | : June 9, 2015 | |
| INVENTOR(S) | : Hart et al. | |

It is certified that error appears in the above-identified patent and that said Letters Patent is hereby corrected as shown below:

On the Title Page insert Item (60)

--Related U.S. Application Data

U.S. Provisional patent application number 61/350,714, filed on June 2, 2010--

Signed and Sealed this
Twenty-fourth Day of November, 2015

Michelle K. Lee
*Director of the United States Patent and Trademark Office*